(12) United States Patent
Little et al.

(10) Patent No.: US 8,238,697 B2
(45) Date of Patent: Aug. 7, 2012

(54) POLARIZATION BEAM SPLITTER-POLARIZATION ROTATOR STRUCTURE

(75) Inventors: Brent E. Little, Glen Head, NY (US); Wei Chen, Ellicott City, MD (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 12/762,495

(22) Filed: Apr. 19, 2010

(65) Prior Publication Data

US 2010/0202724 A1 Aug. 12, 2010

Related U.S. Application Data

(60) Division of application No. 11/782,457, filed on Jul. 24, 2007, now Pat. No. 7,702,188, which is a continuation-in-part of application No. 11/222,358, filed on Sep. 8, 2005, and a continuation-in-part of application No. 11/495,201, filed on Jul. 28, 2006, now Pat. No. 7,373,042.

(51) Int. Cl.
*G02F 1/295* (2006.01)
*G02B 6/42* (2006.01)

(52) U.S. Cl. ................ 385/5; 385/28; 385/32

(58) Field of Classification Search ............. 385/5, 28, 385/32
See application file for complete search history.

(56) References Cited

U.S. PATENT DOCUMENTS

| | | | | |
|---|---|---|---|---|
| 3,955,202 A * | 5/1976 | Young | ............. | 343/756 |
| 4,781,424 A | 11/1988 | Kawachi et al. | | |
| 5,361,320 A | 11/1994 | Liu et al. | | |
| 6,278,813 B1 * | 8/2001 | Takada et al. | ............. | 385/24 |
| 6,477,287 B1 * | 11/2002 | Hait | ............. | 385/15 |
| 6,546,161 B2 * | 4/2003 | Okuno et al. | ............. | 385/14 |
| 6,560,387 B1 * | 5/2003 | Hehlen et al. | ............. | 385/39 |
| 6,580,842 B1 * | 6/2003 | Hehlen et al. | ............. | 385/11 |
| 6,600,582 B1 * | 7/2003 | Liu et al. | ............. | 398/79 |
| 6,625,364 B2 | 9/2003 | Johnson et al. | | |
| 6,862,130 B2 * | 3/2005 | Batchko et al. | ............. | 359/326 |
| 6,907,169 B2 * | 6/2005 | Vahala et al. | ............. | 385/50 |
| 6,947,639 B2 * | 9/2005 | Singh et al. | ............. | 385/37 |
| 7,068,864 B2 * | 6/2006 | Hanashima et al. | ............. | 385/6 |
| 7,127,131 B2 * | 10/2006 | Watts | ............. | 385/11 |
| 7,221,826 B2 * | 5/2007 | Hanashima et al. | ............. | 385/43 |
| 7,228,015 B2 * | 6/2007 | Watts et al. | ............. | 385/11 |
| 7,236,668 B2 * | 6/2007 | Hanashima et al. | ............. | 385/43 |
| 7,245,793 B2 * | 7/2007 | Kamei et al. | ............. | 385/14 |
| 7,263,247 B1 * | 8/2007 | Hehlen et al. | ............. | 385/14 |
| 2001/0009595 A1 * | 7/2001 | Okuno et al. | ............. | 385/14 |
| 2001/0046363 A1 * | 11/2001 | Purchase et al. | ............. | 385/140 |
| 2002/0154844 A1 * | 10/2002 | Shekel et al. | ............. | 385/8 |
| 2002/0179912 A1 * | 12/2002 | Batchko et al. | ............. | 257/79 |
| 2003/0012501 A1 * | 1/2003 | Nakajima et al. | ............. | 385/37 |
| 2003/0081903 A1 | 5/2003 | Vahala et al. | | |
| 2003/0099428 A1 | 5/2003 | LoCascio et al. | | |
| 2004/0126052 A1 * | 7/2004 | Kamei et al. | ............. | 385/14 |
| 2005/0254128 A1 * | 11/2005 | Watts | ............. | 359/558 |
| 2005/0265403 A1 * | 12/2005 | Anderson et al. | ............. | 372/20 |
| 2005/0271325 A1 | 12/2005 | Anderson et al. | | |
| 2006/0018584 A1 * | 1/2006 | Watts et al. | ............. | 385/11 |
| 2008/0147759 A1 | 6/2008 | Fiorentino et al. | | |

\* cited by examiner

*Primary Examiner* — K. Cyrus Kianni
(74) *Attorney, Agent, or Firm* — Dunlap Codding P.C.; David L. Soltz

(57) ABSTRACT

A polarization beam splitter-polarization rotator-polarization beam combiner optical structure comprising a pair of polarization rotators having a polarization beam splitter associated with the input ends of the two polarization rotators, and a polarization beam combiner associated with output ends of the two polarization rotators, and a method of purifying a light signal comprising TE and TM modes by disassociating the primary TE and TM modes from first order splitter and rotation error components.

3 Claims, 5 Drawing Sheets

POLARIZATION BEAM SPLITTER-POLARIZATION ROTATOR STRUCTURE

CROSS-REFERENCE TO RELATED APPLICATIONS

This application is a divisional of application Ser. No. 11/782,457 (the '457 application), filed Jul. 24, 2007 now U.S. Pat. No. 7,702,188, the entire contents of which are incorporated herein by reference. The '457 application is a continuation-in-part of U.S. Ser. No. 11/222,358, filed Sep. 8, 2005. The '457 application is also a continuation-in-part of U.S. Ser. No. 11/495,201, filed on Jul. 28, 2006 now U.S. Pat. No. 7,373,042, each of which is hereby expressly incorporated herein by reference in its entirety.

STATEMENT REGARDING FEDERALLY SPONSORED RESEARCH OR DEVELOPMENT

Not applicable.

BACKGROUND OF THE INVENTION

The present invention relates generally to methods and apparatus for separating polarization modes of an input optical signal, rotating the polarization modes, then recombining the rotated polarization modes.

Light is a vector field that has two primary and orthogonal polarization states or vector directions. Generally, the polarization states are referred to as the S and P polarizations in free space optics, or the TE (Transverse Electric) and TM (Transverse Magnetic) modes of optical waveguides. The performance of optical waveguides and optical devices is often sensitive to the polarization state. That is, the response of the device changes as the polarization state changes. This is particularly pronounced in integrated optical waveguides that are fabricated on dielectric substrates.

Many optical components are insensitive to the input state of polarization. In fiber optic telecommunications, the polarization state of an optical signal that has traveled down any length of fiber is unknown, random, and time varying (due to perturbations in the environment). However, many devices remain polarization sensitive to some degree, and this affects ultimate performance, yield, and cost.

There are some applications where the TE and TM polarization states of an input optical signal need to be spatially split so each can be manipulated independently, such as, for example, PMD (Polarization Mode Dispersion) compensators, where the dispersion of the signal on the two states needs to be equalized. However, when an input light signal is split, or when a signal is rotated, there is usually error introduced into the signal due to inefficiencies in the polarization beam splitter or in the polarization rotator. The error comprises inefficiently split TE and/or TM modes, or inefficiently rotated TE or TM modes.

An apparatus and method for substantially removing the error components of an optical signal from the primary orthogonal components would be desirable.

DETAILED DESCRIPTION OF THE INVENTION

The present invention contemplates a polarization beam splitter-polarization rotator-polarization beam combiner structure comprising a pair of polarization rotators having a polarization beam splitter operatively connected to the input ends of the two polarization rotators, and a polarization beam combiner operatively connected to the output ends of the two polarization rotators, and a method of purifying a light signal comprising TE and TM modes.

In the system and method of the present invention, polarized light comprising both TE and TM modes, is split into separate TE and TM modes (and error components), rotated to enhance the homogeneity of the TE and TM modes, and then recombined whereby undesired polarization error and leakage modes are separated from the primary TE and TM modes to provide a primary light output which is highly purified in the TE and TM modes such that only second order error modes remain in the primary output signal.

Figure 1:
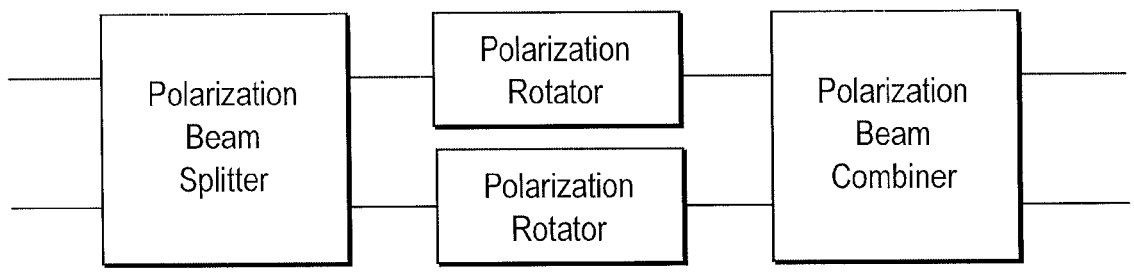
FIG. 1 is a schematic of one embodiment of the polarization beam splitter-assisted polarization rotator of the present invention.

Shown in FIG. 1 is a schematic representation of the present invention which is an optical structure comprising a polarization beam splitter having a pair of outputs, each of which is operatively connected to a polarization rotator, each rotator having an output which is operatively connected to a polarization beam combiner. The optical structure of FIG. 1 in a preferred embodiment is a monolithic structure formed integrally on a chip.

Figure 2:
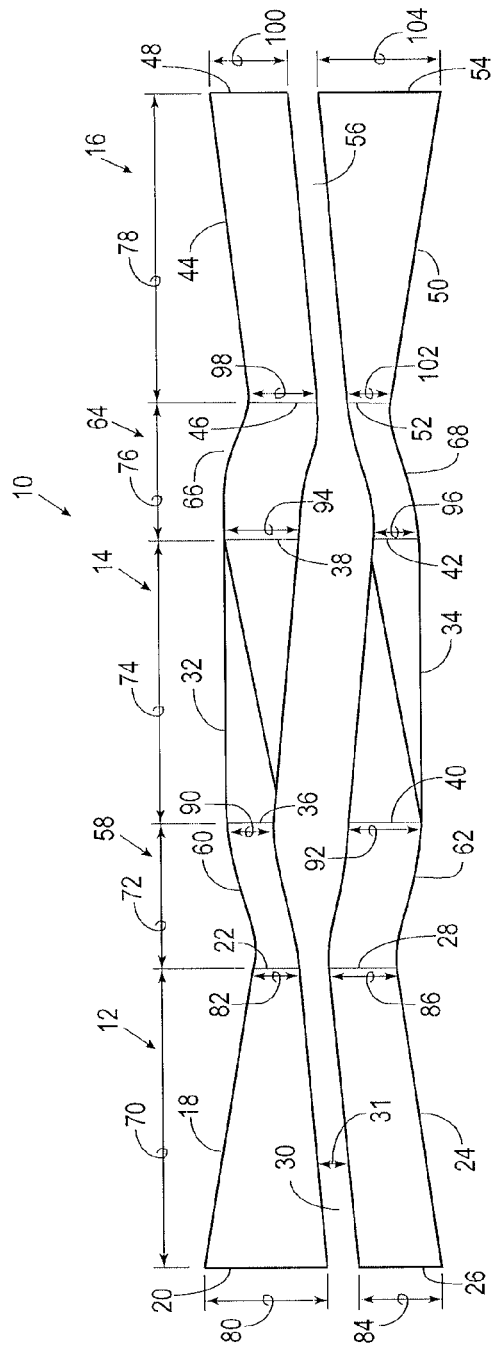
FIG. 2 is a top view of one embodiment of a polarization beam splitter-assisted polarization rotator constructed in accordance with the present invention.

One embodiment of the present invention is shown in FIG. 2 and is designated therein by the general reference numeral 10 (also referred to herein as "system 10").

System 10 is constructed of a polarization beam splitter 12 (also referred to herein as polarization sorter 12, or beam splitter 12), a polarization rotator system 14, and a polarization beam combiner 16 (also referred to herein as polarization combiner 16 or beam combiner 16). The beam splitter 12 is constructed of a first splitter waveguide 18 having an input end 20 and an output end 22, and a second splitter waveguide 24 evanescently coupled to the first splitter waveguide 18 and having an input end 26 and an output end 28. The first splitter waveguide 18 supports at least one guided TE polarized mode of mode ranking mode-I-TE, and at least one guided TM polarized mode of mode ranking mode-j-MT. The second splitter waveguide 24 supports at least one of a guided TE polarized mode of mode ranking mode-I-TE, and a guided TM polarized mode of mode ranking mode-j-TM. A gap 30 optionally separates the first splitter waveguide 18 and the second splitter waveguide 24.

The polarization rotator system 14 is constructed of a first polarization rotator 32, referred to elsewhere herein as first rotator 32, and a second polarization rotator 34, referred to elsewhere herein as second rotator 34. First rotator 32 has an input end 36 and an output end 38, and the second rotator 34 has an input end 40 and an output end 42.

The beam combiner 16 is constructed of a first combiner waveguide 44 having an input end 46 and an output end 48, and a second combiner waveguide 50 having an input end 52 and an output end 54. A gap 56 optionally separates the first combiner waveguide 44 and the second combiner waveguide 50.

Beam splitter 12 and rotator system 14 are operatively connected via a first connector waveguide system 58 which is constructed of a first splitter connector waveguide 60 and a second splitter connector waveguide 62. The first splitter connector waveguide 60 connects the output end 22 of the first splitter waveguide 18 to the input end 36 of the first rotator 32, and the second splitter connector waveguide 62 connects the output end 28 of the second splitter waveguide 24 to the input end 40 of the second rotator 34.

Beam combiner 16 and rotator system 14 are operatively connected via a second connector waveguide system 64 which is constructed of a first combiner connector waveguide 66 and a second combiner connector waveguide 68. The first combiner connector waveguide 66 connects the output end 38 of the first rotator 32 to the input end 46 of the first combiner waveguide 44, and the second combiner connector waveguide 68 connects the output end 42 of the second rotator 34 to the input end 52 of the second combiner waveguide 50.

Figure 3:
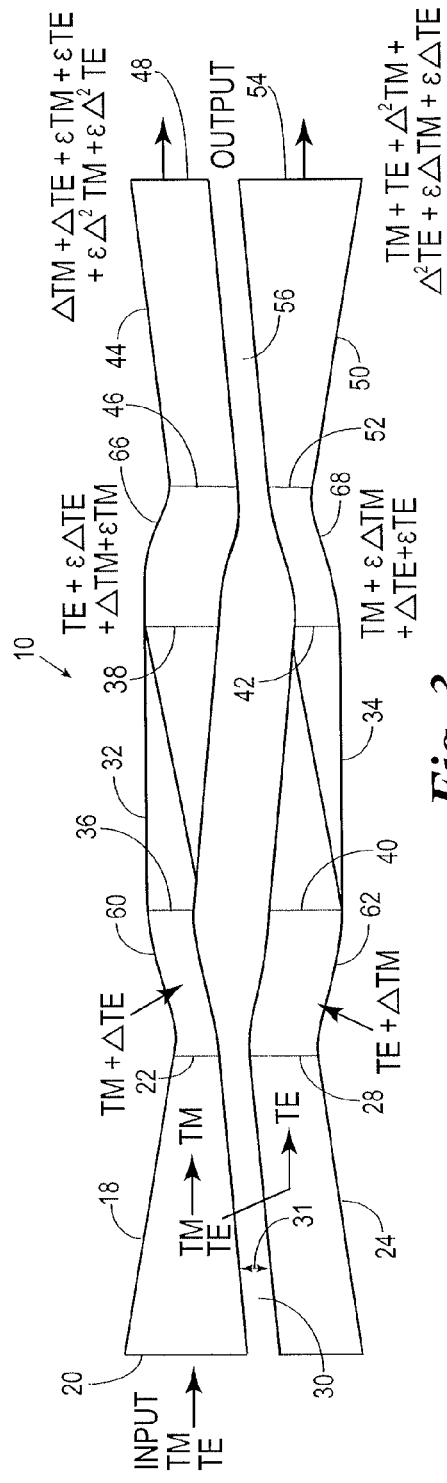
FIG. 3 is a top view of the apparatus of FIG. 1 indicating pathways of polarization modes and error components therein.
Figure 4:
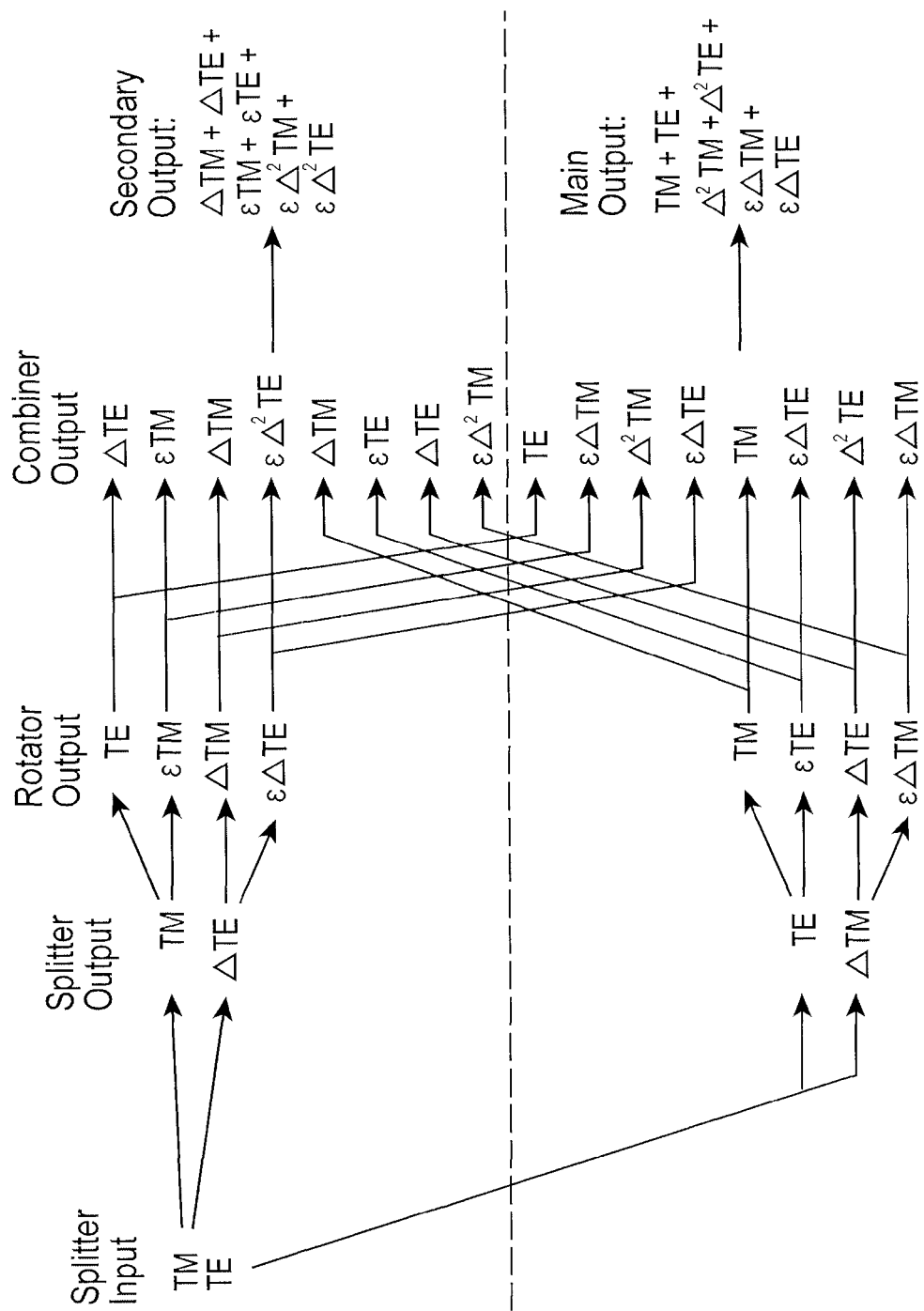
FIG. 4 is a scheme showing the pathway of TM+TE modes and error components thereof as they pass and couple through the waveguide structure.

The first and second splitter waveguides 18 and 24 cooperate to form an adiabatic region in which light having one of the TE and TM polarized modes substantially remains within the first splitter waveguide 18 and light having the other one of the TE and TM polarized modes substantially evanescently couples into the second splitter waveguide 24 although a small portion of each of the TE and TM modes are not properly split and therefore comprise error components as discussed below for FIGS. 3 and 4. In the embodiment shown in FIG. 2, light having the TM mode substantially remains in the first splitter waveguide 18. In general, a light wave (or light signal) is incident upon or enters the beam splitter 12 via the first splitter waveguide 18 and propagates through the adiabatic region where the light wave exits the beam splitter 12 into the connector waveguide system 58. As the light wave propagates through the adiabatic region of the beam splitter 12, the states of polarization are substantially separated as described in further detail below in regard to FIGS. 3 and 4.

In a preferred embodiment, the beam splitter 12 is implemented as a passive rectangular optical chip as described in U.S. Ser. No. 11/495,201. However, it should be understood that the beam splitter 12 can be implemented with other shapes and configurations, such that input and output planes of the beam splitter 12 do not have to be flat or level surfaces or opposing surfaces of an optical chip. In addition, the beam splitter 12 can be implemented as an active beam splitter as shown in U.S. Pat. No. 7,035,491, which is expressly incorporated by reference herein in its entirety.

The input end 20 of the first splitter waveguide 18 is configured to receive light having both the TE and TM polarized modes, and the output end 22 of the first splitter waveguide 18 is configured to provide light of substantially only one of the TE and TM polarized modes (TM mode in the embodiment of FIG. 2). The output end 28 of the second splitter waveguide 24 is configured to provide light of substantially only the other one of the TE and TM polarized modes (TE mode in the embodiment of FIG. 2). The first connector waveguide system 58 comprises output waveguides 60 and 62 which are connected to the output ends 22 and 28.

The first and second splitter waveguides 18 and 24 are separated by the gap 30 having a width 31. The width 31 of gap 30 is small enough to allow the optical modes of the first and second splitter waveguides 18 and 24 to evanescently interact. The width 31 of the gap 30 can be uniform or non-uniform so long as the first and second splitter waveguides 18 and 24 are evanescently coupled. In one embodiment the width 31 is 200-1000 nm and preferably about 500 nm. Further, the gap 31 can be eliminated by constructing the first and second splitter waveguides 18 and 24 of materials having different refractive indices. The gap 30 might also be eliminated if the first and second splitter waveguides 18 and 24 have different heights.

The geometry of the first and second splitter waveguides 18 and 24, e.g., heights, widths, and gap 30 may all vary along the length of the beam splitter.

Each of the first and second splitter waveguides 18 and 24 has a core disposed within a cladding. The core is constructed of a high refractive index material where most of the optical light that enters the beam splitter 12 is confined. High refractive index materials from which the core is constructed include, but are not limited to, silicon, silicon nitride, silicon carbide, silicon oxynitride, silicon oxycarbide, silicon oxynitride-carbide, germanium-doped silica, indium phosphide alloys, gallium arsenide alloys, polymers, and combinations thereof. The cladding is constructed from a lower index material such as, but not limited to, silica, lower index silicon oxynitride, lower index silicon oxycarbide, lower index silicon oxynitride-carbide, lower index doped silica including germanium and or phosphorus doped silica, lower index polymers, and lower index alloys of indium phosphide or gallium arsenide, and combinations thereof. The refractive indexes may vary along the length 70 of the beam splitter 12 (in the z-direction). Examples of suitable cladding and methods for making such cladding are disclosed in U.S. Pat. No. 6,614,977, the entire contents of which is hereby expressly incorporated herein by reference. The core of each of the first splitter waveguide 18 and the second splitter waveguide 24 can have different refractive indexes, but typically the cores are similar for ease of manufacture. Waveguides support so called characteristic modes, or simply "modes" (see, for example, Dietrich Marcuse, "Theory of dielectric optical waveguides", New York, Academic 1974). Modes are Electric (TE) and Magnetic (TM) field profiles for each polarization propagated along a waveguide. A mode or set of modes always carries optical power in a waveguide. Each mode has associated with it a characteristic "effective index", or simply "effective index". The effective index of a particular mode on a particular waveguide can be calculated by a variety of methods, including numerical methods. Commercial computer aided design packages are commonly available (see, for example, Apollo Photonics Inc., Hamilton, Ontario Canada (www.apollophoton.com), or C2V Inc., Enschede, the Netherlands, (www.c2v.nl) for calculating modes and their propagation through complicated optical circuits.

The polarization beam splitter 12 can be manufactured using various techniques such as convention planar lightwave circuit (PLC) fabrication techniques. Conventional PLC fabrication techniques leverage the installed base of batch tools used for integrated electronic circuits (so called "ICs") in order to produce well-controlled circuits in scalable volumes. Such techniques usually involve thin film deposition and etching steps. Dielectric material is deposited or grown on substrates, and then optical circuits are subsequently patterned and etched into those dielectrics. (See, for example, "Integrated Optics, Theory and Technology", by Robert G.

Hunsperger, Spring 4th Edition 1995, or "Optical Integrated Circuit", by Hiroshi Nishihar, Masamitsu Haruna, Toshiaki Suhara, McGraw-Hill 1989.).

The effective mode indexes of the coupled first and second splitter waveguides 18 and 24 are manipulated in such a way so as to cause polarization sorting. The effective index of the splitter waveguides 18 and 24 is a function of the refractive index of the waveguides's core and cladding, as well as the waveguide's height and width (or more generally, its geometry if the guide is not rectangular). In conventional PLC fabrication technologies, especially those that utilize IC fabrication tools, the refractive index of a planar layer is uniform, and it is difficult to vary it along the length of an optical circuit. Varying the width of the waveguides 18 and 24 may be accomplished in the design of a photomask that is used to "print" the circuit. The photomask (or photo-resist as it is sometimes called) delineates all of the waveguide boundaries and is one of the more popular methods of defining the optical circuit pattern. The height of the splitter waveguides 18 and/or 24 can be changed, at least stepwise, by etching away part of the waveguide's original thickness in prescribed regions of the optical circuit or by growing layers onto selected portions of the waveguide. In general, the effective index of any mode supported by a waveguide increases when either the height or the width of a waveguide increases. Further, changing the height or width of a waveguide will affect the TE and TM polarizations unequally.

Returning now to the drawings, as shown in FIG. 2, beam splitter 12 has a length 70, first connector waveguide system 58 has a length 72, rotator system 14 has length 74, second connector waveguide system 64 has a length 76, and beam combiner 16 has a length 78. In one version length 70 and length 78 may be equal and preferably are in the range 500-750 μm, although lengths 70 and 78 may not be equal, and may be less or more than 500-750 μm. Further, length 72 and length 76 may be equal and preferably are in the range of 250-500 μm, although lengths 72 and 76 may not be equal and may be less or more than 250-500 μm. Length 74 is preferably in the range of 1000-2000 μm, but may be less or more than 1000-2000 μm.

Also as shown in FIG. 2, the input end 20 and output end 22 of first splitter waveguide 18 have a width 80 and a width 82, respectively. The input end 26 and output end 28 of second splitter waveguide 24 have a width 84 and a width 86, respectively. Similarly, the input end 46 and output end 48 of first combiner waveguide 44 have a width 98 and a width 100, respectively. Further, the input end 52 and output end 54 of the second combiner waveguide 50 have a width 102 and a width 104, respectively.

Input end 36 and output end 38 of first rotator 32 have a width 90 and width 94, respectively, and input end 40 and output end 42 of second rotator 34 have a width 92 and width 96, respectively.

In preferred embodiments, widths 84, 86, 92, 94, 98 and 100 are equal or substantially equal and are in the range of 1 μm to 2 μm, although they may be less or more than 1 μm to 2 μm, and in a preferred embodiment are 1.4-1.75 μm and more preferably are about 1.6 μm. Widths 80 and 104 are preferably equal or substantially equal and preferably are in the range of 1 μm to 2 μm and more preferably are in a range of 1.2 μm-1.4 μm, and still more preferably are about 1.3 μm, though widths 80 and 104 may be less than or greater than 1 μm-2 μm. Widths 82, 90, 96, and 102 are preferably equal or substantially equal and may be in a range of 0.25 μm to 1.25 μm and more preferably in a range of 0.5 μm to 1 μm, and more preferably are about 0.85 μm, though widths 82, 90, 96, and 102 may be less than or greater than 0.25 μm to 1.25 μm. Further, widths 82, 90, 96, and 102 are less than widths 80 and 104.

In preferred embodiments the first connector waveguide system 58 is integrally constructed with the beam splitter 12, and the second connector waveguide system 64 is integrally constructed with the beam combiner 16, although the first connector waveguide system 58 and second connector waveguide system 64 may be constructed independently of the beam splitter 12 and the beam combiner 16, respectively.

Any polarization beam splitter known in the art may be used herein as beam splitter 12 as long as it functions in accordance with the present invention. In one embodiment, beam splitter 12 is the polarization sorter of U.S. Ser. No. 11/495,201 which is expressly incorporated by reference herein in its entirety described herein. The polarization sorter of U.S. Ser. No. 11/495,201 is briefly described herein below. Further, any polarization rotator known in the art may be used herein as polarization rotator system 14 as long as it functions in accordance with the present invention. In one embodiment, the polarization rotator system 14 comprises a pair of the polarization converters described in U.S. Ser. No. 11/222,358, which is hereby expressly incorporated herein by reference in its entirely and which is described in more detail herein below. Another type of polarization rotator is a bulk half-wave plate such as that constructed from polyimide or crystalline silicon. The polarization beam combiner 16 of the present invention may be any such beam combiner known in the art and preferably is constructed the same as the beam splitter 12 except it is constructed in reverse thereof such that first combiner waveguide 44 is the reverse of second splitter waveguide 24, and second combiner waveguide 50 is the reverse of first splitter waveguide 18.

In a preferred embodiment of the invention the beam splitter 12 is constructed to have a geometry such that light which enters the input end 20 of the first splitter waveguide 18 is substantially split into TM and TE modes for example, such that light in the TM mode is preserved in the first splitter waveguide 18 while light in the TE mode migrates across gap 30 and couples into second splitter waveguide 24, as schematically represented in FIG. 3 in a preferred embodiment.

Alternatively, the beam splitter 12 may be constructed with a geometry (not shown) such that light which enters first splitter waveguide 18 is preserved in the TE mode while light in the TM mode migrates across gap 30 and couples into the second splitter waveguide 24. In such an embodiment, the pathways of the various modes of light therein are the opposite of those shown in FIGS. 3 and 4. Further, the system 10 is reversible and bidirectional such that the outputs 22, 28, 38, 42, 48 and 54, can act as input ends, and input ends 20, 26, 36, 40, 46 and 52 can act as output ends. Also, in another embodiment, input end 26 can be the main input end rather than input end 20, wherein the output end 48 becomes the main output, and output end 54 becomes the secondary output (i.e., in reference to the main and secondary outputs shown in FIG. 4).

The principal of function of the present invention is represented schematically in FIGS. 3 and 4, wherein it is shown how first order error components of the split or rotated polarization modes are separated from the primary optical signal in the second combiner waveguide 50 and are sequestered in the first combiner waveguide 44 for disposal as the light passes through the system 10.

A light signal having TE and TM polarization modes enters the input end 20 of the beam splitter 12 of the system 10. As explained above, as the light signal passes through the first splitter waveguide 18, the majority of the light in the TM mode remains therein and travels through the output end 22 into the first splitter connector waveguide 60 (when present), while the majority of the light in the TE mode couples across the gap 30 into the second splitter waveguide 24 and passes through the output end 28 thereof into the second splitter connector waveguide 62 (when present). However, a portion of the TE mode, designated as $\Delta$TE, fails to couple into the second waveguide splitter 24 and is output through the output end 22 along with light in the TM mode, while a portion $\Delta$TM of the light in the TM mode leaks into the second splitter waveguide 24 and is output through the output end 28 along with the light of the TE mode within the second splitter waveguide 24.

The light in TM and $\Delta$TE (splitter error) modes enters the input end 36 of the first rotator 32 and the light in TE and $\Delta$TM (splitter error) modes enters the input end 40 of the second rotator 34.

As the light in TM and $\Delta$TE modes travels through the first rotator 32, the TM mode is substantially rotated to the TE mode, although some TM is not fully rotated and comprises rotator error $\epsilon$TM. The light in $\Delta$TE mode is substantially rotated to $\Delta$TM, although some of the $\Delta$TE mode is not fully rotated and comprises rotator error $\epsilon\Delta$TE. The light in the TE, $\epsilon$TM, $\Delta$TM, and $\epsilon\Delta$TE modes exits the first rotator 32 via the output end 38.

As the light in TE and $\Delta$TM modes travels through the second rotator 34, the TE mode is substantially rotated to the TM mode, while a rotator error portion $\epsilon$TE is not fully rotated. The light in mode $\Delta$TM is substantially rotated to $\Delta$TE mode, while a rotator error portion $\epsilon\Delta$TM is not fully rotated. The light in the TM, $\epsilon$TE, $\Delta$TE, and $\epsilon\Delta$TM modes exits the second rotator 34 via the output end 42.

The light from first rotator 32 comprising modes TE, $\epsilon\Delta$TE, $\Delta$TM and $\epsilon$TM then enters the input end 46 of the first combiner waveguide 44 and the light from the second rotator 34 comprising modes TM, $\epsilon\Delta$TM, $\Delta$TE and $\epsilon$TE enters the input end 52 of the second combiner waveguide 50.

As indicated in FIGS. 3 and 4, as the light in TE, $\epsilon$TM, $\Delta$TM and $\epsilon\Delta$TE modes passes through the first combiner waveguide 44, light in TE mode is substantially entirely coupled into the second combiner waveguide 50, while a minor portion $\Delta$TE remains in the first combiner waveguide 44. Similarly, light in $\epsilon\Delta$TE mode is substantially entirely coupled into second combiner waveguide 50, while a minor portion $\epsilon\Delta^2$TE remains in the first combiner waveguide 44. Eight in modes $\epsilon$TM and $\Delta$TM substantially entirely remains in first combiner waveguide 44, while minor portions $\epsilon\Delta$TM and $\Delta^2$TM, respectively, are coupled into second combiner waveguide 50.

Further, as light in TM, $\epsilon$TE, $\Delta$TE, and $\epsilon\Delta$TM modes passes through the second combiner waveguide 50, light in the TM mode substantially remains therein while a minor portion $\Delta$TE couples into the first combiner waveguide 44. Similarly, light in the $\epsilon\Delta$TM mode remains substantially in the second combiner waveguide 50 while a minor portion $\epsilon$TE couples into the first combiner waveguide 44. Light in modes $\epsilon$TE and $\Delta$TE substantially couple into the first combiner waveguide 44, while minor portions $\epsilon\Delta$TE and $\Delta^2$TE, respectively, remain in the second combiner waveguide 50.

The main output of the system 10, via the output end 54 of the second combiner waveguide 50, comprises the TM and TE modes, as well as minor second order error components $\Delta^2$TM, $\Delta^2$TE, $\epsilon\Delta$TM and $\epsilon\Delta$TE modes. The secondary output of the system 10, via the output end 48 of the first combiner waveguide 44 comprises first order error components $\Delta$TM, $\Delta$TE, $\epsilon$TM and $\epsilon$TE, as well as error components $\epsilon\Delta^2$TM and $\epsilon\Delta^2$TE. The main output thus comprises the primary signal (TM and TE modes) and minor second order error components, while the secondary output comprises all of the first order error components, thereby sequestering the majority of the error components away from the primary TE and TM modes.

Figure 5:
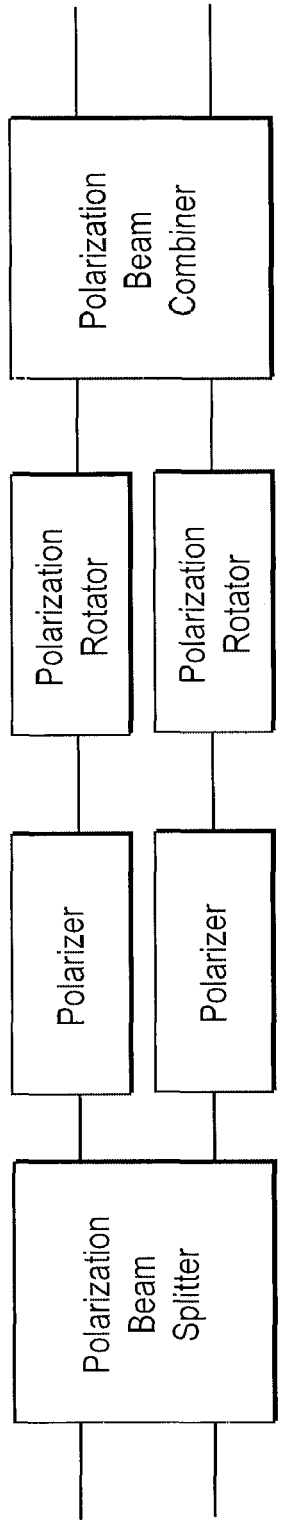
FIG. 5 is a schematic of an alternate embodiment of the polarization beam splitter-assisted polarization rotator of the present invention.
Figure 6:
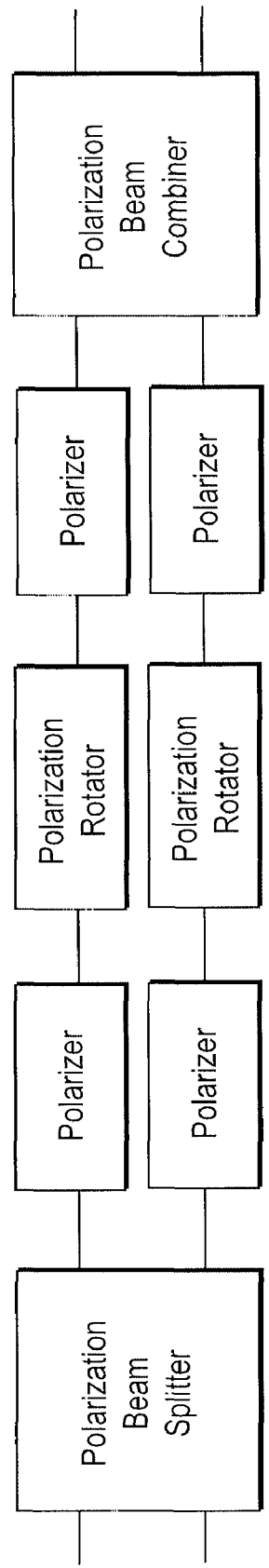
FIG. 6 is a schematic of another alternate embodiment of the present invention.

Any of the optical polarization beam splitter-assisted structures contemplated herein can be constructed to incorporate other optical elements, such as polarizers, for example, as shown schematically in FIGS. 5 and 6. FIG. 5 shows an optical structure similar to optical structure shown in FIG. 1 except having polarizers positioned between the polarization beam splitter and the two polarization rotators therein. FIG. 6 shows an optical structure similar to that of FIG. 5 except with additional polarizers positioned between the two polarization rotators and the polarization beam combiner. Such polarizers are well known to those of ordinary skill in the art. The polarizers, in FIG. 6 for example, may be configured to reject the error terms before and after the polarization rotators, for example the $\Delta$TE and $\Delta$TM entering the rotators may be eliminated. Other optical elements which may be incorporated into the optical structure of the present invention, for example with or in substitution of the polarizers of FIGS. 5 and 6, as contemplated herein include, but are not limited to, filters, polarizers, waveguides, reflectors, couplers, interconnects, phase modulators, intensity modulators, frequency shifters, transducers, oscillators, power splitters, and photodetectors.

Figure 7:
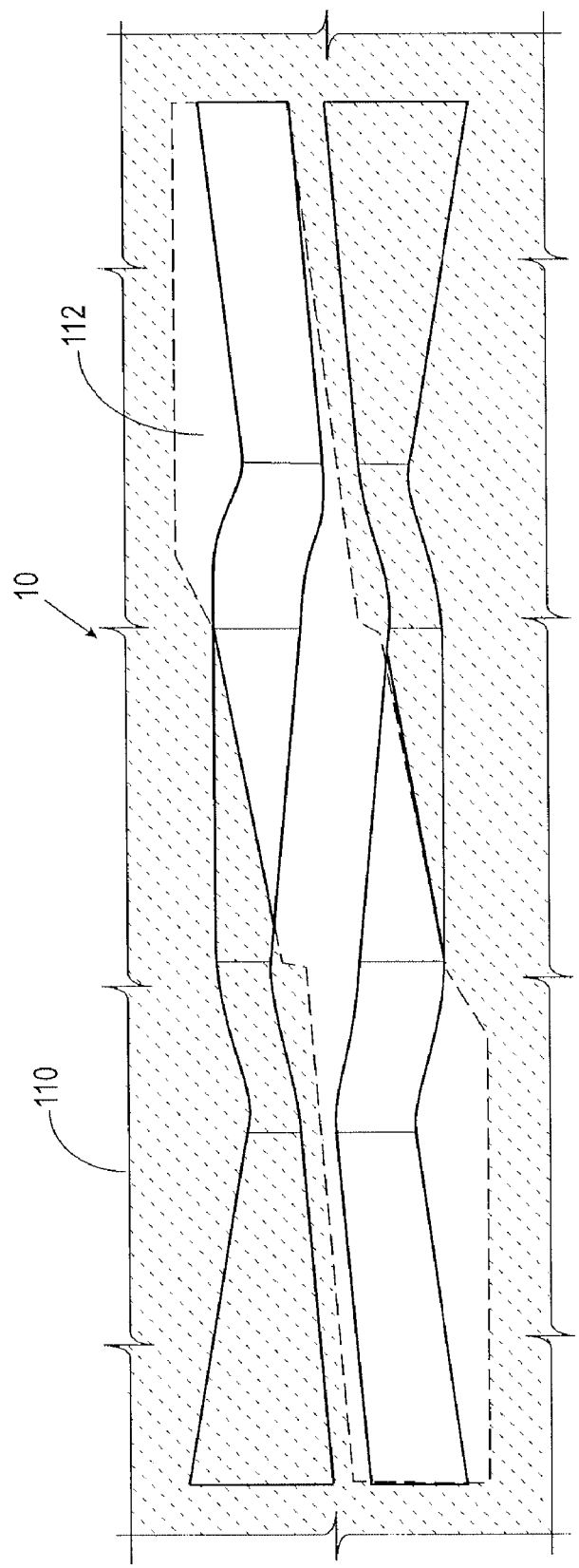
FIG. 7 is a schematic view of a resist mask arrangement for manufacturing the apparatus of FIG. 2.

The system 10 or any of the systems contemplated herein can be fabricated using any suitable technique in the art, such as an etching technique as schematically represented in FIG. 7. The etching process typically begins with a starting structure that includes a buried waveguide. The buried waveguide has a core material that is at least partially buried or disposed within a cladding material. The core material of the waveguide is typically constructed of a material selected from a group consisting of silicon, silicon nitride, silicon carbide, silicon oxynitride, silicon oxycarbide, silicon oxynitride-carbide, germanium-doped silica, indium phosphide alloys, gallium arsenide alloys, polymers, and combinations thereof.

In a next step of the etching method, a photoresist layer 110 having a desired pattern is disposed on the buried waveguide (FIG. 7). The photoresist layer may include one or more openings 112 having a desired shape or pattern.

In general, the photoresist layer 110 is constructed of a material that prevents material beneath the photoresist layer 110 from being removed during the etching process. Thus, during etching, the exposed area resulting from the opening 112 in the photoresist layer 110 is removed to a proper depth, and the pattern of the opening 112 is transferred into the core. After the etching process is complete, another layer of cladding material is deposited over the entire structure and planarized if needed. A more detailed description of etching methods for forming the splitter waveguides having varying heights and widths is described in a co-pending patent application entitled "ADIABATIC POLARIZATION CONVERTER" and identified by U.S. Ser. No. 11/222,358, the content of which is hereby incorporated herein by reference. Further, the photoresist layer 110 may be configured as a negative photoresist.

It should be noted that the optimum polarization conversion is a result of both the initial etch pattern and also the etch depth. However, since the separating mechanism of the system 10 is adiabatic, it is expected that the performance characteristics of the system 10 fabricated utilizing the etching method discussed above will have wide latitude in both fabrication and design. Further, although the present system 10 is described as adiabatic in operation, the system 10 could operate as a non-adiabatic system.

While the above method for fabricating the system 10 of the present invention is described above in terms of fabricating one system 10, it should be apparent to those skilled in the art that such fabrication methods, as well as any other appropriate fabrication techniques currently known in the art or later developed, can be utilized to fabricate one or more of the system 10, or portions thereof, such as when one or more system 10 are included on a chip, or on a wafer (e.g., a silicon wafer) having a plurality of chips.

A system of coupled waveguides where all waveguides are the same thickness can be fabricated by a number of well-known methods. See for example, "Integrated Optics, Theory and Technology", by Robert G. Hunsperger, Spring $4^{th}$ Edition 1995, or "Optical Integrated Circuit", by Hiroshi Nishihar, Masamitsu Fiaruna, Toshiaki Suhara, McGraw-Hill 1989.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. An optical structure, comprising:
    a polarization beam splitter comprising an input end, and an output end having a first output and a second output;
    a polarization rotator system comprising a first polarization rotator having an input end and an output end, and a second polarization rotator having an input end and an output end; and
    a polarization beam combiner comprising an input end having first and second inputs, and an output end; and
    a first optical path including the first output of the polarization beam splitter, the input end of the first polarization rotator, the output end of the first polarization rotator, and the first input of the polarization beam combiner, the first optical path being configured such that first light propagates along the first optical path from the first output of the polarization beam splitter to the first input of the polarization beam combiner through the first polarization rotator; and
    a second optical path including the second output of the polarization beam splitter, the input end of the second polarization rotator, the output end of the second polarization rotator, and the second input of the polarization beam combiner, the second optical path being configured such that second light propagates along the second optical path from the second output of the polarization beam splitter to the second input of the polarization beam combiner through the second polarization rotator, wherein the first polarization rotator is spaced from the second optical path and the second polarization rotator is spaced from the first optical path.

2. The optical structure of claim 1 comprising at least one additional optical element.

3. The optical structure of claim 2 wherein the at least one additional optical element is a filter, polarizer, waveguide, reflector, coupler, interconnect, phase modulator, intensity modulator, frequency shifter transducer, oscillator, power splitter, resonator or photodetector.

* * * * *